Nov. 8, 1960   M. TRAITE ET AL   2,959,056
CATHETER PRESSURE GAUGE

Filed Feb. 10, 1958  2 Sheets-Sheet 1

INVENTORS
MAX TRAITE
WILLIAM W. O'HARA
WILLIAM LAKATOSH
BY
Cyrus D. Samuelson
ATTORNEY

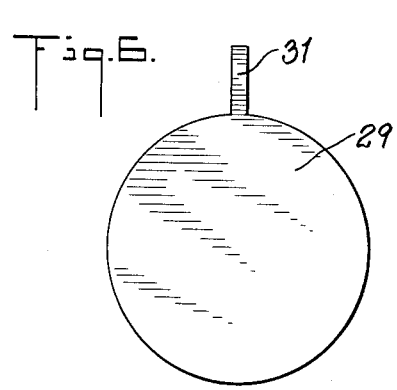
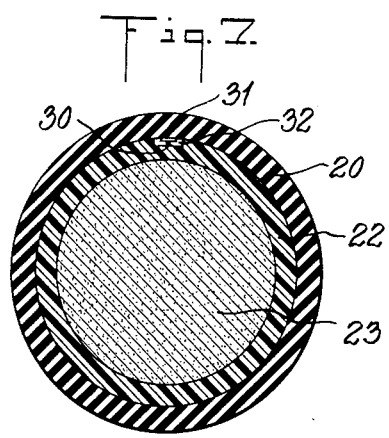
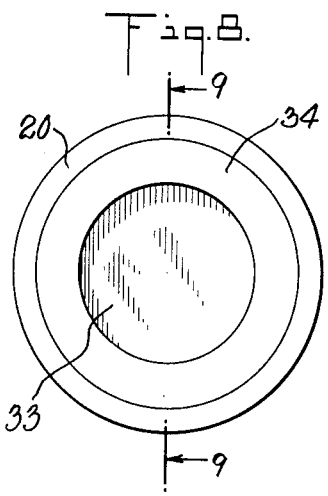
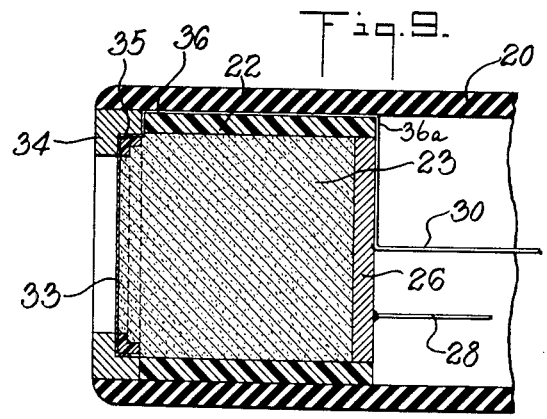
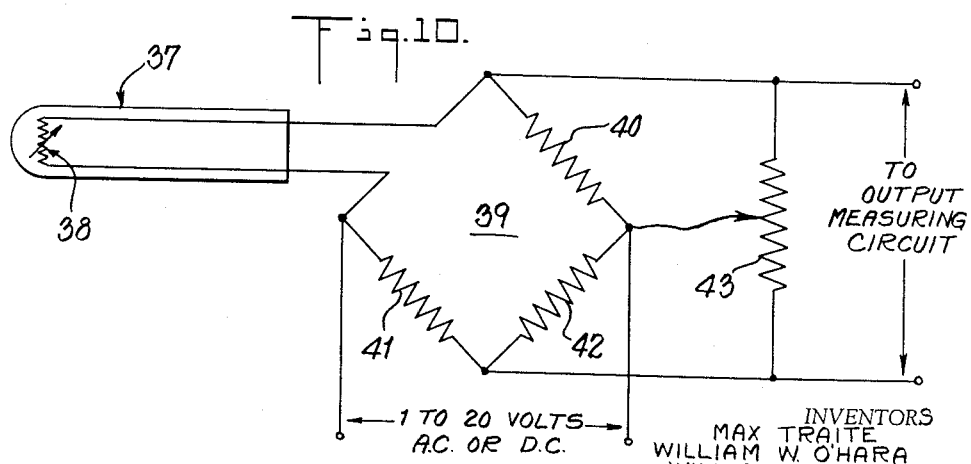

United States Patent Office 2,959,056
Patented Nov. 8, 1960

2,959,056

CATHETER PRESSURE GAUGE

Max Traite, North Brunswick, William W. O'Hara, Westfield, and William Lakatosh, Dunellen, N.J., assignors to Gulton Industries, Inc., Metuchen, N.J., a corporation of New Jersey Filed Feb. 10, 1958, Ser. No. 714,188

3 Claims. (Cl. 73—398)

Our invention relates to catheter pressure gauges and in particular to those catheter pressure gauges which are equipped with the sensitive elements at the tip of the catheter.

Most pressure gauges for use with a catheter employ a long liquid column in the catheter. The liquid column is contiguous at one end with the fluid whose pressure is desired, and with the gauge at the other end. The use of a liquid column, a visco-elastic catheter, and the difficulty of removing dissolved air from the liquid column are all disadvantages of these systems.

Our gauge has its sensitive elements at the tip of the catheter, in direct contact with the blood fluid, and utilizes the catheter only as a housing for the gauge and as an insulator for the electrical lead wires from the gauge.

Accordingly, it is a principal object of our invention to provide a pressure gauge whose sensitive elements may be mounted at the tip of the catheter.

It is a further object of our invention to provide such a gauge which is of the carbon granule type.

It is a still further object of our invention to provide such a gauge which is simple and economical to construct.

It is a still further object of our invention to provide such a gauge which will be highly sensitive and responsive to small changes in cardiac pressures.

Other objects and advantages of our invention will be apparent during the course of the following description.

Figure 1:
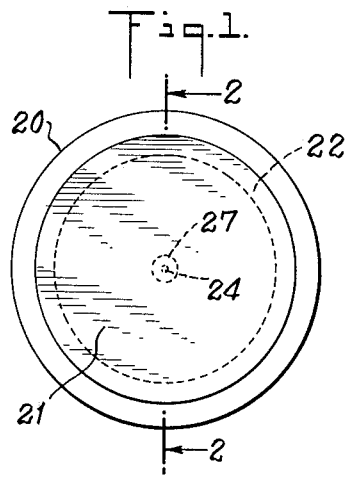
Figure 2:
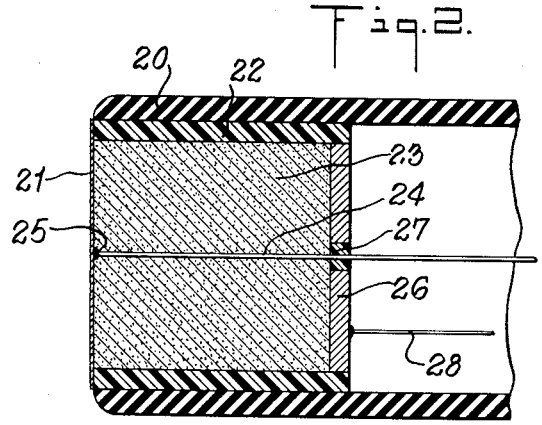
Figure 3:
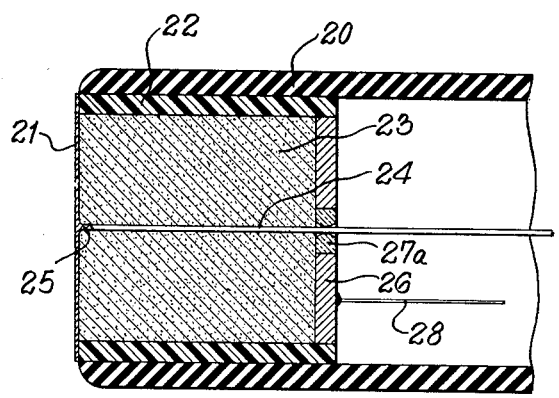
Figure 4:
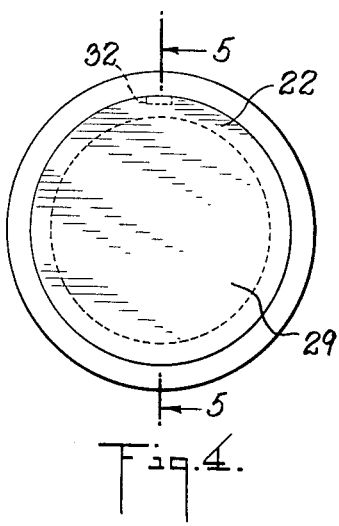
Figure 5:
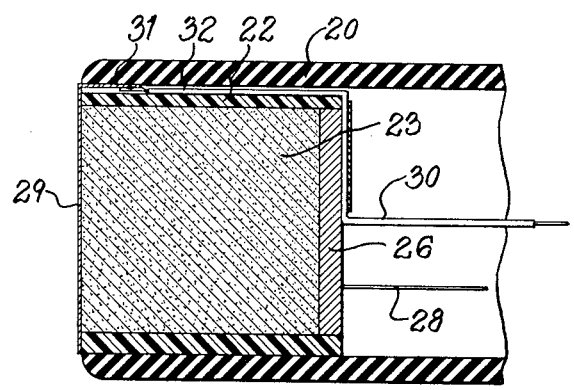

In the accompanying drawings, forming a part of this application, and in which like numerals are employed to designate like parts throughout the same, Figure 1 is a front elevational view of an embodiment of our invention, Figure 2 is a cross-sectional view along the line 2—2 of Figure 1, Figure 3 is a view similar to Figure 2 of a further embodiment of our invention, Figure 4 is a front elevational view of a still further embodiment of our invention, Figure 5 is a cross-sectional view along the line 5—5 of Figure 4, Figure 6 is an elevational view of the diaphragm used in the embodiment of Figure 4, Figure 7 is a front elevational view of the embodiment of Figure 4 with the diaphragm removed and the housing, catheter and carbon button shown in cross-section, Figure 8 is a front elevational view of a preferred embodiment of our invention, Figure 9 is a cross-sectional view along the line 9—9 of Figure 8, and Figure 10 is a schematic diagram of the electrical circuit associated with the several embodiments of our invention.

In the drawings wherein, for the purpose of illustration, are shown several embodiments of our invention, the numeral 20 designates a single lumen catheter into the end of which is built our invention. 21 designates a diaphragm of stainless steel or similar material which is suitably affixed at its periphery by means of an epoxy adhesive or otherwise to cylindrical plastic container 22 which is formed of Bakelite or similar material. Metal plate 26 of brass or like material is similarly affixed to 22 at the end opposite 21 and carbon granules 23 are packed in the enclosure so formed in the manner well known in the art for the manufacture of carbon microphones and similar devices. 27 is an insulating bushing of plastic or similar material and serves to insulate rod 24 from plate 26. 24 is welded or soldered to 21 at point 25 and serves as one electrical connection to the unit; the other electrical connection is 28 which is soldered, welded or otherwise affixed to 26.

In Figure 3, jewel bearing 27a is used in place of bushing 27 and 24 and 21 are formed from a single piece of metal so that there is no weld or soldered joint at point 25.

In Figures 4 through 7, diaphragm 29 is formed of stainless steel or similar material and carries tab 31 as an integral part thereof. 31 is folded into recess 32 in container 22 and connection is made to it by soldering or otherwise affixing wire 30 to it. 30 serves as one electrical connection and is physically attached to 26 by gluing it thereto for mechanical rigidity but is electrically insulated therefrom.

In Figures 8 and 9, diaphragm 33 is formed of polyethylene terephthalate, .0005" thick, to which a metallic coating of a metal such as silver is applied on the inside. 33 is held in place between housing 34 which is of stainless steel or similar material and washer 35 which is of tetrafluoroethylene or similar material. Metal leaf 36 of gold or similar material is carried along 22 and soldered to 33. At its other end 36 is soldered to 30 at point 36a. There is a large central opening in 34 so that 33 is subjected to the pressures to be measured. 34 is suitably affixed to 20 by means of epoxy adhesive or similar material.

In Figure 10, 37 designates the catheter generally and 38 designates the gauges of our invention generally. 38 is one arm of bridge 39 which also comprises fixed resistors 40, 41 and 42. 43 is connected across the output of the bridge and serves to balance the system. Input is applied to 39 in the amount of the order of 1 to 20 volts across the terminals in Figure 10 marked "1 to 20 volts" and the output, which is dependent on the pressure, is measured across the terminals in Figure 10 marked "To Output Measuring Circuit." Other systems may be used in place of the bridge illustrated in Figure 10 so long as the resistance variation of the gauge varies an output voltage. The applied voltage may be either direct or alternating.

In the embodiment of Figures 1 and 2, 24 is welded or soldered to 21 at 25 and is insulated from 26 by being carried through insulating bushing 27. 24 serves as one electrical connection and 28 which is soldered to 26 serves as the other electrical connection. In operation, the movement of diaphragm 21, under the influence of pressure changes, causes the resistance of 23 to vary and this variation in resistance is detected, thereby enabling the user to measure the pressure changes in both amplitude and phase.

The embodiment of Figure 3 is similar to that of Figures 1 and 2 except that insulating bushing 27 is replaced by jewel bearing 27a which also serves to insulate 24 from 26, and 24 and 21 are formed from a single piece of metal, thereby eliminating the weld at point 25. By the use of 27a, frictional losses are reduced and the measurements are more accurate. Furthermore, by forming 24 and 21 from a single piece of material there is much less likelihood of causing deformation of 21 in the region of junction 25.

In the embodiment of Figures 4 through 7, diaphragm 29 is formed with a tab 31 which is folded into recess 32 in 22 and lead 30 is soldered to 31. 30, which serves as one electrical connection, is insulated from 26 but is attached to 26 by epoxy adhesive or other similar material to give it mechanical strength and to remove strain from the solder connection between 30 and 31. In this embodiment, the central rod 24 and bushing 27 in plate 26 are eliminated, thereby making the construction simpler. The operation is identical with that described for the embodiment of Figures 1 and 2.

In the embodiment of Figures 8 and 9, the central rod 24 and the bushing in 26 have been similarly eliminated. Diaphragm 33 is formed of metallized polyethylene terephthalate and is held in place by means of housing 34 and washer 35. Leaf 36 is soldered to 33 at one end and to 30 at point 36a (the other end). 36 is insulated between 20 and 22 and makes electrical contact only where it is soldered. Operation of this embodiment is identical with that of the other embodiments.

Figure 10 illustrates a preferred circuit for use with the several embodiments of our invention. 39 is a bridge circuit and 38 is one arm of the bridge. Voltage is applied across the terminal marked "1 to 20 volts" and the bridge is adjusted by means of potentiometer 43 so that there is no output with no pressure on the diaphragm (no change in resistance of 38). A meter such as a zero-center direct current millivoltmeter connected to the terminals marked "To Output Measuring Circuit" may be used to detect both the amplitude and direction of the pressure being measured. Other measuring circuits or indicators may be employed but we have found those, above described, to be preferable for use with gauges of our invention.

All of the embodiments of our invention are small enough to be contained in a single lumen catheter, inserted in a vein and pushed in so that the gauge is in the heart and may be used to measure heart pressures.

While we have described our invention by means of specific examples and in specific embodiments, we do not wish to be limited thereto for obvious modifications will occur to those skilled in the art without departing from the spirit of our invention or the scope of the subjoined claims.

Having thus described our invention, we claim:

1. A pressure gauge for insertion in a catheter comprising in combination an insulating tubular container, a conductive diaphragm at one end of said tubular container and affixed thereto, a conductive plate at the other end of said tubular container and affixed thereto, carbon granules contained within said tubular container, said diaphragm and said plate, means for making electrical connection to said conductive plate, said conductive plate being provided with an opening therein, and a rod connected to said diaphragm, said rod being carried through said opening in said conductive plate and being insulated from said conductive plate.

2. A pressure gauge as described in claim 1 wherein said rod is insulated from said conductive plate by means of an insulated bushing in said conductive plate.

3. A pressure gauge as described in claim 1 wherein said rod is insulated from said conductive plate by means of a jewel bearing in said conductive plate.

References Cited in the file of this patent

UNITED STATES PATENTS

| | | |
|---|---|---|
| 246,512 | Hunnings | Aug. 30, 1881 |
| 2,634,721 | Greenwood | Apr. 14, 1953 |
| 2,796,863 | Von Wittern | June 25, 1957 |

FOREIGN PATENTS

| | | |
|---|---|---|
| 663,521 | France | Apr. 9, 1929 |